United States Patent
Wang et al.

(10) Patent No.: US 6,928,308 B2
(45) Date of Patent: Aug. 9, 2005

(54) MOBILE PHONE HAND-FREE EXTENSION DEVICE

(75) Inventors: Guan-Wu Wang, Hsinchu (TW);
Yi-Jeng Yang, Hsinchu (TW);
Wen-Chung Liu, Taoyuan (TW);
Teng-Chi Lin, Keelung (TW)

(73) Assignee: Micro Mobio Corporation Taiwan Branch (USA), Hsinchu (TW)

( * ) Notice: Subject to any disclaimer, the term of this patent is extended or adjusted under 35 U.S.C. 154(b) by 541 days.

(21) Appl. No.: 10/165,554

(22) Filed: Jun. 8, 2002

(65) Prior Publication Data

US 2004/0204158 A1 Oct. 14, 2004

(51) Int. Cl.$^7$ .............................................. H04M 1/00
(52) U.S. Cl. ............................... 455/569.2; 455/569.1; 455/575.1; 455/575.9; 455/550.1 H
(58) Field of Search ........................... 455/66.1, 550.1, 455/569.1, 569.2, 575.1, 575.9, 92–93, 173.1, 176.1, 179.1, 182.1, 182.2, 183.2, 184.1, 185.1, 186.1

(56) References Cited

U.S. PATENT DOCUMENTS

| | | | | |
|---|---|---|---|---|
| 5,457,815 A | * | 10/1995 | Morewitz, II | ............ 455/161.1 |
| 5,613,232 A | * | 3/1997 | Toshida et al. | .......... 455/226.4 |
| 5,867,794 A | * | 2/1999 | Hayes et al. | ................ 455/557 |
| 5,987,305 A | * | 11/1999 | Reitberger | .................... 455/62 |
| 6,134,456 A | * | 10/2000 | Chen | ........................ 455/569.2 |
| 2003/0036357 A1 | * | 2/2003 | McGowan | .................... 455/62 |
| 2003/0054855 A1 | * | 3/2003 | Kojola et al. | ............... 455/550 |
| 2004/0038716 A1 | * | 2/2004 | Gass | ....................... 455/569.1 |

FOREIGN PATENT DOCUMENTS

JP          2001111680 A    *   4/2001    ............ H04M/1/60

* cited by examiner

*Primary Examiner*—William Trost
*Assistant Examiner*—Meless Zewdu

(57) ABSTRACT

A mobile phone hand-free extension device includes a FM radio transmitter with an active frequency searching circuitry to utilize a vehicular FM radio receiver for reproducing the audio signals from the mobile phone. The active frequency searching circuitry in this invention automatically detects which frequency band the vehicular FM radio receiver is currently using and set the RF frequency of the FM transmitter to the detected frequency. The FM transmitter relays the audio signals from the mobile phone by transmitting the audio signals through radio wave to the vehicular FM radio receiver to be reproduced by the speaker of the receiver.

15 Claims, 3 Drawing Sheets

MOBILE PHONE HAND-FREE EXTENSION DEVICE

FIELD OF THE INVENTION

The present invention relates generally to a mobile phone hand-free extension device that utilizes the vehicular radio receiver to provide audio signals to the mobile phone user, and more specifically to a mobile phone hand-free extension device with a radio frequency (RF) transmitter and a frequency searching circuitry to automatically relay the audio signal received from the mobile phone to the vehicular radio receiver.

BACKGROUND OF THE INVENTION

The technology of mobile phones has made possible mobile voice communication for millions of people. Mobile phones are carried and used daily by hundreds of millions of people and become an ordinary household items worldwide. The mobile phone user quite often makes the phone call while driving an automobile and therefore creates a potential hazardous driving condition since the driver has to hold the mobile phone and drive at the same time.

A hand-free kit is an external accessory to the mobile phone and its purpose is to free the driver from distraction of holding and using the mobile phone. Several technologies have been pursued to enable the driver to use the mobile phone without holding the cellular phone.

U.S. Pat. No. 6,134,456 discloses a control switch box with cables linking the mobile phones and the vehicular stereo system. However, installating such kind of accessory is quite involved and requires wiring and routing inside the automobile body.

The U.S. Pat. No. 5,867,794 discloses another method that uses an FM transmitter to send the audio signal from the mobile phone to the vehicular FM radio. In the disclosure, there is no need to physically connect the mobile phone and the vehicular audio system. However, the disadvantage of this approach is that the frequency of the FM transmitter has to be set to the same channel as the FM radio receiver that the driver is currently listening to whenever he wants to use the hand-free kit. The frequency of either the FM transmitter or the FM radio receiver has to be adjusted and it causes much inconvenience in application.

It will be an innovative approach to include an apparatus or a method to detect radio frequency of the FM radio receiver and to set the frequency of the FM transmitter automatically.

SUMMARY OF THE INVENTION

This invention has been made to overcome the drawbacks of the conventional mobile phone hand-free kit. The primary object is to provide to a mobile phone hand-free extension device. The mobile phone hand-free extension device utilizes the vehicular radio receiver to provide audio signals to the mobile phone user. It includes a radio frequency (RF) transmitter and a frequency searching circuitry to automatically relay the audio signal received from the mobile phone to the vehicular radio receiver.

The mobile phone hand-free extension device comprises a RF signal detector, a frequency searching circuitry and an FM transmitter. The RF signal detector detects the radio frequency communication between the mobile phone and the base station. Whenever a call activity between the mobile phone and the base station is detected by the RF signal detector, the RF signal detector activates the frequency searching circuitry to find the frequency of the FM radio receiver if the mobile phone user is listening to the FM radio. As soon as the frequency is located, the FM transmitter sends a radio wave modulated by the audio signal of the mobile phone to the FM radio receiver. On receiving the radio wave, the FM radio receiver demodulates the radio wave to retrieve the original audio signal, which is further reproduced by the speaker of the FM radio receiver. The car-driving mobile phone user therefore has no need to hold the mobile phone close to his ear since the voice and sound coming out of the mobile phone is relayed to an external speaker by this invention.

Another object of the present invention is to provide a method to detect the radio frequency being tuned by a vehicular FM radio receiver and to relay the audio signal from a mobile phone to the vehicular FM radio receiver using a radio wave at the frequency detected.

The foregoing and other objects, features, aspects and advantages of the present invention will become better understood from a careful reading of a detailed description provided herein below with appropriate reference to the accompanying drawings.

DETAILED DESCRIPTION OF THE INVENTION

Figure 1:
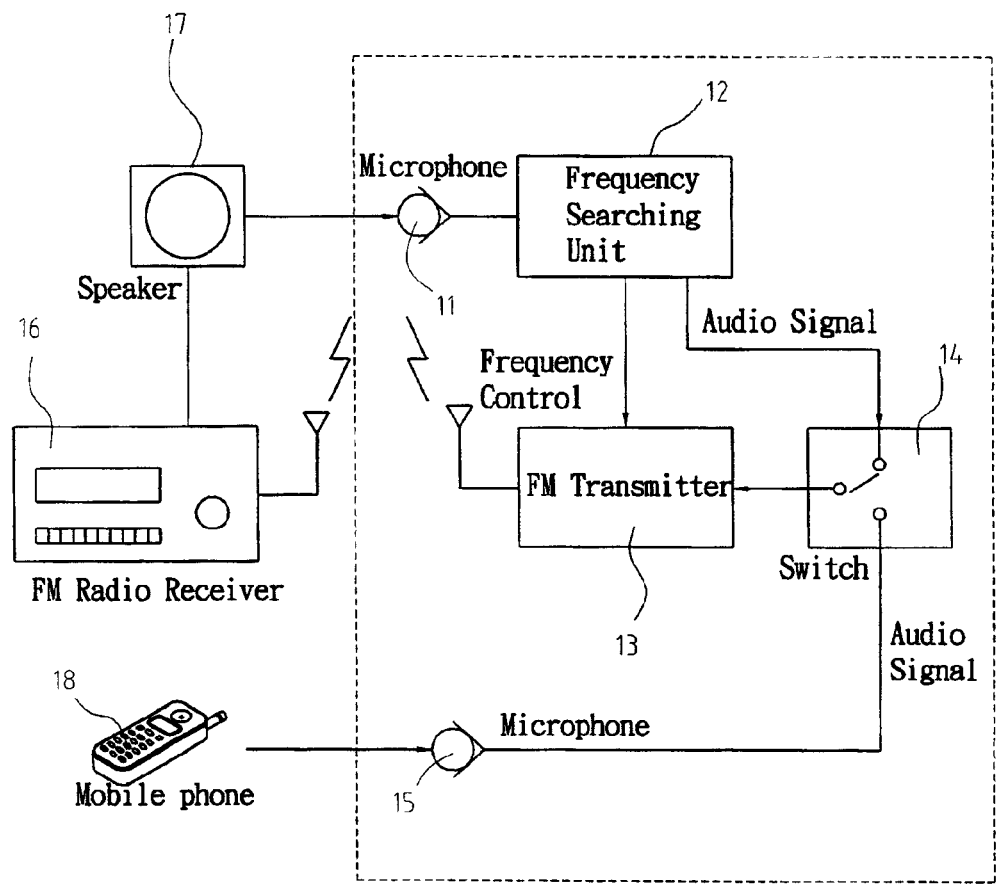
FIG. 1 is a general schematic diagram showing the audio output extension for a mobile phone hand-free operation according to the present invention.

FIG. 1 is a general schematic diagram showing the audio output extension device for a mobile phone hand-free operation according to the present invention. Referring to FIG. 1, the mobile phone hand-free extension device comprises a microphone 11, an active frequency-searching unit 12, an FM transmitter 13, a switch 14 and a second microphone 15.

The following describes in detail how the frequency-searching unit detects the radio frequency of the FM radio receiver and sets the frequency of the FM transmitter automatically.

The active frequency-searching unit 12 controls the radio frequency of the voltage-controlled oscillator (VCO) inside the FM transmitter 13 and sends a signal with a particular pattern at the audio frequency to modulate the RF carrier of the FM transmitter. The signal sent with a particular pattern can be either a digital signal or an analog signal. The radio frequency of the FM transmitter is controlled in such a way that it starts from the lower band edge of the commercial FM band such as 88–108 MHz and increases repeatedly by a predetermined frequency step to the upper band edge. The preferred predetermined frequency step can be the allocated channel bandwidth of an FM station. At each frequency point, the FM transmitter will send out the modulated RF carrier. If the frequency of the FM transmitter matches that of the FM radio receiver 16, the signal with a particular pattern at the audio frequency will be demodulated, retrieved and broadcasted from the speaker 17 that is connected to the FM radio receiver.

The microphone 11 picks up the audio signal from the speaker and sends it to the active frequency search unit to determine if this audio signal is the same as the particular signal that the FM transmitter originally sent out.

Figure 2:
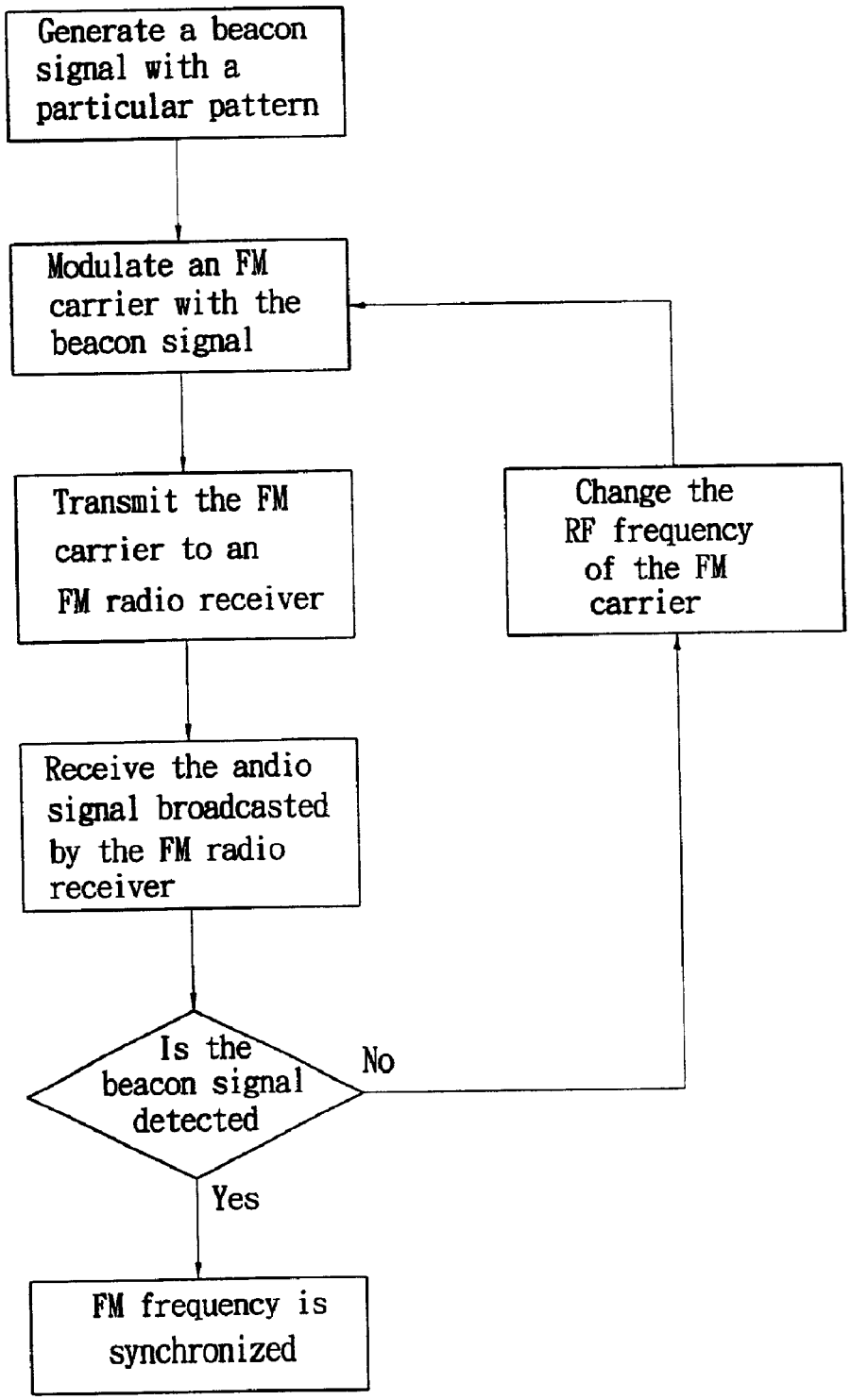
FIG. 2 shows a flow chart for automatically searching the frequency of an FM radio receiver according to the present invention.

FIG. 2 shows a flow chart for automatically searching the frequency of an FM radio receiver according to the present invention. As shown in FIG. 2, the frequency stepping process, the signal emitting process, and the signal comparing process are repeated over and over again until the original signal sent out by the frequency-searching unit is received by it again. When this condition is met, the RF frequency of the FM transmitter is locked on to that of the FM radio receiver.

After the RF frequency of the FM transmitter is set to that of the FM radio receiver, the switch 14 disconnects the audio signal generated by the frequency-searching unit 12 and connects the audio signal picked up by the second microphone 15 to the FM transmitter. The second microphone is placed close to the internal speaker of the mobile phone 18 to pick up the audio signal generated by the voice of the other party on the line. As a result, the audio signal is relayed to the FM radio receiver 16 and the voice is reproduced by the speaker 17.

Figure 3:
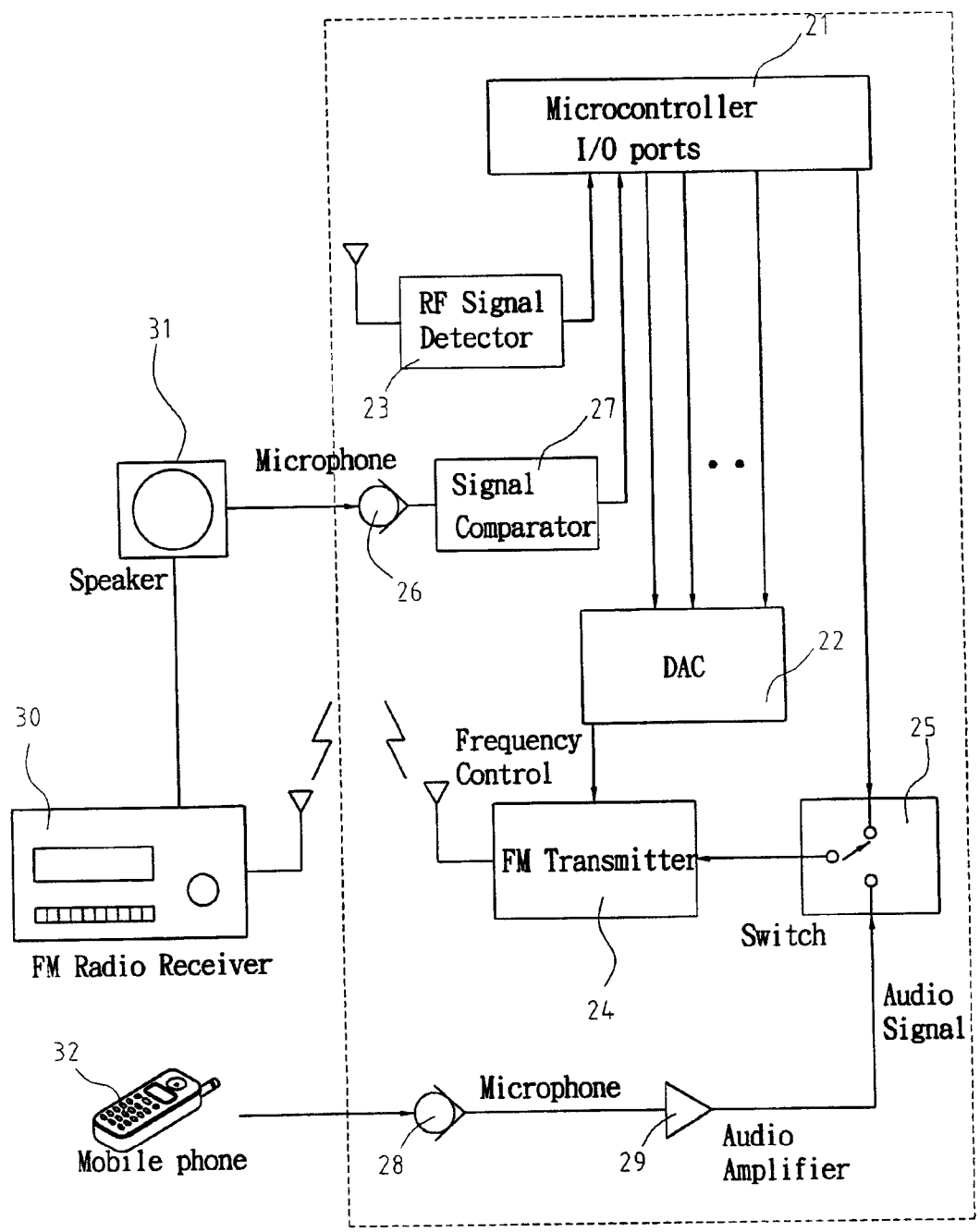
FIG. 3 shows a preferred embodiment of a mobile phone hand-free extension device using a microprocessor and a digital-to-analog converter to realize the frequency-searching unit according to the present invention.

FIG. 3 shows a preferred embodiment of a mobile phone hand-free extension device using a microprocessor and a digital-to-analog converter to realize the frequency-searching unit according to the present invention. Referring to FIG. 3, the frequency-searching unit is realized by a microprocessor-based microcontroller 21 and a digital-to-analog converter (DAC) circuitry 22. This embodiment further includes a RF signal detector 23.

When the RF signal detector detects the signal exchange between the mobile phone 32 and the base station, it sends a signal into one of the I/O port of the microcontroller 21 to activate the frequency searching sequence.

The frequency searching sequence works as follows: the microcontroller uses a plurality of I/O ports to send a parallel digital data to the DAC 22. The number of I/O ports used corresponds to the number of bits of the digital data. The DAC converts the digital data to a corresponding analog DC voltage value. The DC voltage is used to control the oscillating frequency of the voltage-controlled oscillator inside the FM transmitter 24 and as a result the RF frequency of the FM transmitter is controlled by the microcontroller. The DAC is configured such that the minimum analog DC voltage converted from the digital data corresponds to the lower band edge of the commercial FM bands and the maximum analog DC voltage converted from the digital data corresponds to the upper band edge of the commercial FM bands. The microcontroller can increase or decrease the RF frequency of the FM transmitter by a minimum frequency step that is determined by the number of bits used for a digital data. For example, if 10 bits are used for a digital data, the step frequency will be (108–88) MHz divided by $2^{10}$, i.e. 19.5 KHz. The microcontroller increases the RF frequency of the FM transmitter from the lower band edge to the upper band edge or in a reverse way decreases the frequency from upper band edge to the lower band edge repeatedly by a frequency step in a programmable way to cover the whole commercial FM frequency band.

At each frequency point, the microcontroller sends a beacon signal at audio frequency with a particular pattern from one of its I/O ports to the FM transmitter through the switch 25. The pattern of the beacon signal is chosen to be different from any other possible audio signal, such as a voice signal or a noise signal from the automobile in the environment. The RF carrier modulated by the beacon signal is transmitted by the FM transmitter at the RF frequency set by the microcontroller. If the FM radio receiver 30 is working at the same RF frequency, the RF radio receiver 30 will receive and demodulate the beacon signal, which is further broadcasted by the speaker 31.

The microphone 26 picks up the beacon signal and sends it to the signal comparator 27 to determine if the received signal has the same pattern as the original beacon signal. If the signal patterns is matched, it represents a frequency locking condition, i.e. the FM transmitter and the FM radio receiver are both working at the same RF frequency channel. The switch 25 disconnects the signal path between the microcontroller and the FM transmitter, and establishes the signal path among the microphone 28, the amplifier 29 and the FM transmitter 24. The signal comparator 27 can be incorporated in the microcontroller 21 and implemented as a software sequence stored in the memory of the microcontroller.

Therefore, the mobile phone hand-free extension device of the invention has been made to overcome the drawbacks of the conventional hand-free extension device. Its advantages include that there is no need to physically connect the mobile phone and the vehicular audio system and it can detect radio frequency of the FM radio receiver and to set the frequency of the FM transmitter automatically.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method to determine the channel frequency setting of an FM radio receiver, comprising:

generating an electrical signal with a particular pattern;

modulating an FM carrier at a frequency within a commercial FM band with said electrical signal;

transmitting said modulated FM carrier to said FM radio receiver;

receiving an audio signal reproduced by said FM radio receiver and detecting said particular pattern;

determining if the frequency of said FM carrier matches that of said FM radio frequency receiver by the successful detection of said particular pattern; and changing the frequency of said FM carrier and repeating above steps until the frequency of said FM carrier matches that of said FM radio receiver.

2. A mobile phone hand-free extension device, comprising:

a frequency-searching unit for generating and outputting an electrical signal with a particular pattern, detecting said particular pattern from an input signal, and outputting a DC voltage;

an FM transmitter using said electrical signal with a particular pattern to modulate an FM carrier, broadcasting said FM carrier, and using said DC voltage to control a voltage-controlled-oscillator inside said FM transmitter;

a first microphone for picking up an audio signal in an environment;

a second microphone for picking up a voice signal from the mobile phone; and a switch for connecting a signal path either from said second microphone to said FM transmitter or from said frequency-searching unit to said FM transmitter.

3. The mobile phone hand-free extension device as claimed in claim 2, further comprising an audio coupling device that surrounds said second microphone and connects to a speaker of the mobile phone to form an audio channel and to block the sounds in the environment.

4. The mobile phone hand-free extension device as claimed in claim 2, further comprising an audio amplifier coupled to the outputs of said first microphone and said second microphone.

5. The mobile phone hand-free extension device as claimed in claim 2, further comprising an audio amplifier coupled to an output of said first microphone or said second microphone.

6. The mobile phone hand-free extension device as claimed in claim 2, further comprising a RF signal detector that activates said frequency-searching unit when it detects a RF signal at a specified frequency band.

7. The mobile phone hand-free extension device as claimed in claim 6, wherein said RF signal detector detects the RF signal at the frequency within the range allocated for use of mobile phones.

8. The mobile phone hand-free extension device as claimed in claim 2, further comprising a call activity detector to detect call activities of the mobile phone, said call activity detector activating said frequency-searching unit.

9. The mobile phone hand-free extension device as claimed in claim 2, said frequency-searching unit comprising a microprocessor-based microcontroller and a digital-to-analog converter that outputs said DC voltage to control said voltage-controlled oscillator inside said FM transmitter.

10. The mobile phone hand-free extension device as claimed in claim 2, said frequency-searching unit comprising a comparator circuitry coupled to a microprocessor-based microcontroller and a digital-to-analog converter that outputs said DC voltage to control said voltage-controlled oscillator inside said FM transmitter, said comparator circuitry comparing said input signal to a reference signal with said particular pattern and outputting a signal to said microcontroller.

11. A mobile phone hand-free extension device, comprising:
a frequency-searching unit generating and outputting an electrical signal with a particular pattern, detecting said particular pattern from an input signal, and outputting a DC voltage;

an FM transmitter using said electrical signal with said particular pattern to modulate an FM carrier, transmitting said FM carrier, and using said DC voltage to control a voltage-controlled-oscillator inside said FM transmitter;

a first microphone picking up an audio signal in an environment;

a switch connecting a signal path either from an audio output of the mobile phone to said FM transmitter or from said frequency-searching unit to said FM transmitter; and a call activity detector detecting call activities of the mobile phone, and said call activity detector activating said frequency-searching unit.

12. The mobile phone hand-free extension device as claimed in claim 11, wherein said hand free extension device is encased within the casing of the mobile phone.

13. The mobile phone hand-free extension device as claimed in claim 11, said frequency-searching unit comprising a microprocessor-based microcontroller and a digital-to-analog converter that outputs said DC voltage to control said voltage-controlled oscillator inside said FM transmitter.

14. The mobile phone hand-free extension device as claimed in claim 11, said frequency-searching unit comprising a comparator circuitry coupled to a microprocessor-based microcontroller and a digital-to-analog converter that outputs said DC voltage to control said voltage-controlled oscillator inside said FM transmitter, said comparator circuitry comparing said input signal to a reference signal with said particular pattern and outputting a signal to said microcontroller.

15. The mobile phone hand-free extension device as claimed in claim 11, said frequency-searching unit further comprising:
a signal generator circuitry, outputting said electrical signal with said particular pattern;

a comparator circuitry coupled to a microprocessor-based microcontroller, said comparator circuitry comparing said input signal with said electrical signal using said particular pattern, and outputting a signal to said microcontroller; and a digital-to-analog converter, outputting said DC voltage to control said voltage-controlled oscillator inside said FM transmitter.

* * * * *